3,179,682
MIXED SULFITE ESTERS OF ARYL GLYCOL ETHERS AND ALKYNOLS

Rupert A. Covey, Wolcott, Allen E. Smith, Oxford, and Winchester L. Hubbard, Woodbridge, Conn., assignors to United States Rubber Company, New York, N.Y., a corporation of New Jersey
No Drawing. Filed Aug. 20, 1962, Ser. No. 218,090
6 Claims. (Cl. 260—456)

This application is a continuation-in-part of our application Serial No. 131,741, filed August 16, 1961, and now abandoned.

This invention relates to new chemicals, namely new organic esters of sulfurous acid, more particularly to mixed sulfite esters of alkynyl alcohols and glycol ethers.

The new compounds of the present invention are useful as insecticides, particularly for the control of mites. They may also be used as plasticizers.

The chemicals of the present invention may be represented by the general formula

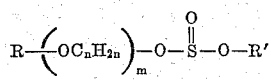

in which R is an aromatic radical, e.g. phenyl, or naphthyl, or a phenyl or a naphthyl (aryl) radical having one or more substituents in the aryl nucleus selected from the group consisting of alkyl having up to 9 carbon atoms, cycloalkyl, haloalkyl, alkoxy, nitro and halo; R' is an acyclic alkynyl radical; $n$ is 2 to 10, and $m$ is 1 to 10. Where $m$ is greater than 1, the repeating oxyalkyl groups may be the same or different. Examples of R are phenyl, 1-naphthyl, 2-naphthyl, p-tolyl, o-tolyl, isopropylphenyl, tert.-butylphenyl, tert.-amyl phenyl, nonylphenyl, cyclohexylphenyl, chloromethylphenyl, methoxyphenyl, nitrophenyl, and haloaryl having up to 5 halo radicals, e.g. bromophenyl, 2-chlorophenyl, 2,4-dichlorophenyl, trichlorophenyl, pentachlorophenyl. Examples of R' are acyclic alkynyl radicals having 3 to 10 carbon atoms, i.e. $C_nH_{2n-3}$— radicals where $n$ is 3 to 10, e.g. propargyl, 1-(3-butynyl), 2-(3-butynyl), 2-(2-methyl-3-butynyl), 1-(2-heptynyl), 1-(3-nonynyl). Examples of the —$OC_nH_{2n}$— group are ethyleneoxy, trimethyleneoxy, tetramethyleneoxy, propyleneoxy, 1,2-dimethylethyleneoxy.

The preparation of the chemicals of the invention may be carried out by reacting the selected alkynyl alcohol with the separately prepared chlorosulfinate of the selected glycol ether, which may be made by reacting the selected glycol ether with thionyl chloride. The glycol ether which is a glycolmonoether may be made by reacting the selected phenol, with one to ten moles of the selected alkylene oxide per mole of the phenol. Such preparation is illustrated by the following reactions with the same symbols R, R' and $m$ as in the above general formula and for convenience using ethylene oxide ($n=2$) as the alkylene oxide:

(1)

$$R-OH + m\text{-}CH_2\text{---}CH_2 \longrightarrow R\text{---}(OCH_2\text{---}CH_2)_m OH$$
$$\phantom{R-OH + m\text{-}}\diagdown O \diagup$$

(2)

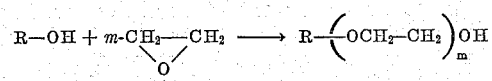

(3)

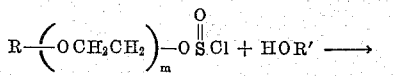

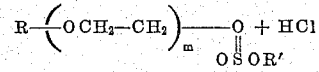

Reaction (1) above is a well known and smooth reaction. With one mole of alkylene oxide per mole of phenol, the result will be substantially a single compound containing one alkylene oxide unit. With two or more moles of alkylene oxide per mole of phenol, a mixture of products having varying numbers of alkylene oxide units is produced. If a compound with a specific number of alkylene oxide units is desired, the mixture may be fractionated. In the present invention for insecticidal uses, it is satisfactory to have mixtures of compounds containing different numbers of alkylene oxide units from 1 to 10. The following reaction of p-tert.-butyl phenol with propylene oxide is illustrative of the well known preparation of the starting glycol ethers according to reaction (1) above:

p-Tert.-butyl phenol (300 g., 2.0 moles) and 4 g. sodium hydroxide were combined and the mixture heated to 150° C. Propylene oxide (279 ml., 232 g., 4.0 moles) was added during two hours maintaining the reaction temperature at 150–160° C. The mixture was cooled, the catalyst was neutralized with dilute hydrochloric acid, and the product taken up in benzene. The benzene was removed and the product heated to 90° C. (0.5 mm.) to remove the last traces of volatile materials. The crude reaction mixture weighed 509 g. (95.7%). It was a mixture of compounds having the structure

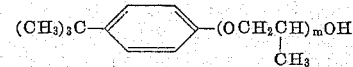

where $m=1, 2, 3, 4, 5$, etc. The mixture was distilled and the following fractions collected:

| | Percent |
|---|---|
| $m=1$, B.P. 107–128° C. (1 mm.) | 32 |
| $m=2$, B.P. 128–153° C. (1 mm.) | 47 |
| $m=3$, B.P. 163–184° C. (1 mm.) | 14 |
| Residue | 7 |

Center cuts of these fractions yielded the pure compounds as follows:

$m=1$, B.P. 116–120° C. (1 mm.)
$m=2$, B.P. 146–153° C. (1 mm.)
$m=3$, B.P. 175–177° C. (1 mm.)

The preparation of the chlorosulfinates of the glycol ethers according to reaction (2) is carried out at a temperature of between —5° C. and 30° C., preferably near 0° C., and the yield of chlorosulfinate is nearly quantitative. An inert solvent such as benzene, xylene or solvent naphtha may be used. This is illustrated in Example I below.

The preparation of the sulfite esters is carried out in the presence of an HCl acceptor, such as pyridine, dimethyl aniline or trimethylamine, and in a solvent such as benzene, xylene or solvent naphtha. The reaction temperature is generally between —10° C. and 50° C., preferably near 0° C. This is illustrated in Example I below.

Examples of the sulfite diesters of the present invention are:

Propargyl phenoxyethyl sulfite
Propargyl o-toloxyethyl sulfite
Propargyl m-(n-propyl)phenoxyethyl sulfite
Propargyl p-tert.-amylphenoxyethyl sulfite
Propargyl p-chlorophenoxyethyl sulfite
Propargyl 1-naphthoxyethyl sulfite

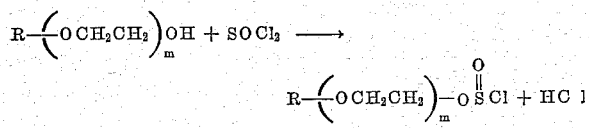

Propargyl p-tert.-butylphenoxyisopropyl sulfite
Propargyl p-isopropylphenoxyethyl sulfite
Propargyl o-tert.-butylphenoxyisopropoxyisopropyl sulfite
Propargyl m-nitrophenoxydiisopropoxyisopropyl sulfite
Propargyl p-cyclohexylphenoxyethyl sulfite
Propargyl p-chloromethylphenoxyethyl sulfite
Propargyl p-toloxyoctyl sulfite
Propargyl p-methoxyphenoxyethyl sulfite
2-(3-butynyl) p-tert.-butylphenoxyethoxyisopropyl sulfite
1-(2-butynyl) o-chlorophenoxytriethoxyethyl sulfite
1-(3-hexynyl) p-isopropylphenoxyhexoxyhexyl sulfite.

Example I illustrates the preparation of the compounds of the present invention.

EXAMPLE I

*Preparation of propargyl p-tert.-butylphenoxyisopropyl sulfite* p-Tert.-butylphenoxyisopropyl chlorosulfinate was prepared as illustrated in reaction (2) above as follows: p-tert.-butylphenoxyisopropyl alcohol or propylene glycol mono-p-tert. butyl phenyl ether (104 g., 0.5 mole) prepared according to reaction (1) as described above was dissolved in 150 ml. benzene and the solution was cooled to 0° C.–5° C. Thionyl chloride (45.4 ml., 74.4 g., 0.625 mole) was added dropwise during one hour, maintaining the reaction temperature below 5° C. The mixture was allowed to warm to room temperature and stand for 15 hours. The benzene was evaporated under reduced pressure at room temperature and the residue was warmed to 35° C. (0.8 mm.) to remove the last traces of solvent. Yield, 141.3 g. (97.3%) of a pale yellow oil which was nearly odorless and relatively stable when stored in a refrigerator.

The propargyl p-tert.-butylphenoxyisopropyl sulfite was prepared as illustrated in reaction (3) above as follows: propargyl alcohol (3.2 ml., 3.1 g., 0.055 mole), 4.1 ml. (4.0 g., 0.05 mole) pyridine and 30 ml. xylene were combined and the solution cooled to 0° C.–5° C. A solution of 14.5 g. (0.05 mole) p-tert.-butylphenoxyisopropyl chlorosulfinate in 10 ml. xylene was added during 10 min. keeping the reaction temperature below 5° C. The mixture was stirred for ½ hour and was washed twice with 25 ml. portions of water. The mixture was then stirred for one hour with 50 ml. 2 N NaOH. The xylene solution was washed several times with saturated salt solution until the washings were neutral to pH paper. The xylene was removed under reduced pressure and the residue heated to a pot temperature of 140° C. (0.2 mm.) to remove volatile materials. The product was filtered through Dicalite (a diatomaceous earth filter-aid) giving 13.9 g. (89.7% yield) of an amber-colored oil. *Analysis.*—Calculated for $C_{16}H_{22}O_4S$: S, 10.33%. Found: S, 10.58%.

Sulfur analyses of other chemicals of the present invention were:

Propargyl p-tert.-butylphenoxyisopropoxyisopropyl sulfite. Calculated S, 8.70%. Found: 8.18%.

Propargyl p-tert.-butyldiisopropoxyisopropyl sulfite. Calculated S, 7.52%. Found: 6.51%.

Propargyl p-tert.-amylphenoxyethyl sulfite. Calculated S, 10.33%. Found: 9.78%.

Propargyl p-tert.-butylphenoxyisopropoxyisopropyl sulfite. Calculated S, 8.70%. Found: 8.61%.

Propargyl p-toloxyisopropyl sulfite. Calculated S, 11.95%. Found: 11.19%.

Propargyl 1-paraisopropylphenoxy-2-butyl sulfite. Calculated S, 10.33%. Found: 9.14%.

Propargyl 2-methyl-4-tert.-butylphenoxyisopropyl sulfite. Calculated S, 9.89%. Found: 8.72%.

Propargyl 1-paratertiaryamylphenoxy-2-butyl sulfite. Calculated S, 9.47%. Found: 8.49%.

Propargyl 3-paratertiarybutylphenoxy-2-butyl sulfite. Calculated S, 9.89%. Found: 8.92%.

Propargyl 1-paratertiarybutylphenoxy-2-amyl sulfite. Calculated S, 9.48%. Found: 8.58%.

Propargyl o-toloxyisopropoxyisopropyl sulfite. Calculated S, 9.82%. Found: 9.11%.

Propargyl p-tolyloxyisopropoxyisopropyl sulfite. Calculated S, 9.82%. Found: 8.74%.

Propargyl p-isopropylphenoxyethoxyethyl sulfite. Calculated S, 9.82%. Found: 8.99%.

Propargyl p-isopropylphenoxyisopropoxyisopropyl sulfite. Calculated S, 9.05%. Found: 8.60%.

Propargyl 1-(1-paraisopropylphenoxy-2-butoxy)-2-butyl sulfite. Calculated S, 8.42%. Found: 7.60%.

Propargyl 2-methyl-4-tert.-butylphenoxyisopropoxyisopropyl sulfite. Calculated S, 8.38%. Found: 7.74%.

1-(3-butynyl) p-tert.-amylphenoxyethyl sulfite. Calculated S, 9.88%. Found: 9.89%.

2-(3-butynyl) p-tert.-amylphenoxyethyl sulfite. Calculated S, 9.88%. Found: 9.38%.

1-(3-hexynyl) p-tert.-amylphenoxyethyl sulfite. Calculated S, 9.10%. Found: 8.73%.

2-(3-butynyl) o-tert.-butylphenoxyisopropoxyisopropyl sulfite. Calculated S, 8.38%. Found: 7.57%.

1-(2-butynyl) p-tert.-amylphenoxyethyl sulfite. Calculated S, 9.88%. Found: 8.98%.

2-(2-methyl-3-butynyl) p-tert.-butylphenoxyisopropyl sulfite. Calculated S, 9.48%. Found: 8.64%.

EXAMPLE II

This example illustrates the insecticidal activity of the chemicals of the present invention in tests against the larvae of *Aedes aegypti* (L.) mosquitoes. Fourth instar larvae were used. These larvae normally reach this stage in 5 days at 80° F. after hatching.

To 10 mgs. of each chemical to be tested was added 1 ml. of acetone and 100 ml. of water to give a concentration of 100 parts per million (p.p.m.), and a portion was also diluted to 10 p.p.m.

Twenty-five ml. aliquots, replicated once, of each chemical to be tested at concentrations of 100 p.p.m. and 10 p.p.m. and of checks without the chemical and of plain water checks were placed in test tubes and from 5 to 25 larvae were added. The tubes were held at 70° F. in darkness for 72 hours. At the end of this period the live and dead larvae were counted and the percent mortality calculated. All the larvae were alive in the checks (0% mortality). The percent mortality of the larvae treated with the chemicals of the present invention is shown in the following table:

| Chemical | Percent Mortality at— | |
|---|---|---|
| | 100 p.p.m. | 10 p.p.m. |
| Propargyl p-tert.-butylphenoxy-isopropyl sulfite | 100 | 100 |
| Propargyl p-tert.-butylphenoxy-isopropoxy-isopropyl sulfite | 100 | 50 |
| Propargyl p-tert.-butylphenoxy-diisopropoxy-isopropyl sulfite | 100 | 41 |

EXAMPLE III

This example illustrates the effectiveness of the chemicals of the present invention for controlling mites.

Pinto beans in the two-leaf stage and grown in 4″ baskets under greenhouse conditions at 70° F.–75° F. were used. Three plants for a total of six leaves were in each basket for each test. The tests on the chemicals and checks were replicated once. Aqueous suspensions of the chemicals were prepared by adding to 0.2 gram of the chemical one drop (0.03 gram) of a commercial surface-active dispersing agent (isooctylphenyl polyethoxy ethanol) and 1 ml. of acetone, washing into 200 ml. of water, agitating to form a dispersion and diluting with water to the desired concentrations of 1000 p.p.m. and 200 p.p.m.

The plants were sprayed with the dispersions of the chemicals at the various concentrations and the check plants were sprayed with aqueous solutions containing surface-active agent and acetone without the chemicals. The sprayings thoroughly wet the upper surface of the leaves. The plants were returned to the greenhouse. The following day (20-24 hours later), rings of an adhesive preparation non-toxic to the organisms under test, such as is used on fly papers and for ringing trees, were placed around the borders of the upper surfaces of the leaves to restrict the mites to the upper leaf surface. Mites were transferred to the thus treated leaves by placing bean leaflets heavily infested with two-spotted adult mites, *Tetranychus telarius* L. within the boarder of the adhesive preparation on the leaves of the plants under test. A count of the number of mites transferred was made the same day. The counts ranged from 30 to 300 mites on the six leaves. The plants were kept in the greenhouse for another four days. A final count of the number of living mites remaining on the leaves was then made. The percent control is found by using the formula:

$$\text{Percent control} = 100\left(1 - \frac{\text{Final count living mites}}{\text{Original count}}\right)$$

The control of mites by the chemicals of the present invention at the various concentrations is shown in the following table (the check treatments without the chemicals had about 20% mortality):

| Chemical | Percent Control at— | |
|---|---|---|
| | 1,000 p.p.m. | 200 p.p.m. |
| Propargyl p-tert.-butylphenoxyisopropyl sulfite | | 99 |
| Propargyl p-tert.-butylphenoxyisopropoxyisopropyl sulfite | | 99 |
| Propargyl p-tert.-butylphenoxydiisopropoxyisopropyl sulfite | 99 | 90 |
| Propargyl p.tert.-amylphenoxyethyl sulfite | 100 | 100 |
| Propargyl o-tert.-butylphenoxyisopropoxyisopropyl sulfite | 100 | 100 |
| 1-(3-Butynyl) p-tert.-amylphenoxyethyl sulfite | 100 | 96 |
| 2-(3-Butynyl) p-tert.-amylphenoxyethyl sulfite | 100 | 99 |
| 2-(2-Methyl-3-butynyl) p-tert.-amylphenoxyethyl sulfite | 100 | 84 |
| 1-(3-Hexynyl) p-tert.-amylphenoxyethyl sulfite | 76 | 30 |
| 2-(3-Butynyl) o-tert.-butylphenoxyisopropoxyisopropyl sulfite | 100 | 73 |
| 1-(2-Butynyl) p-tert.-amylphenoxyethyl sulfite | 100 | 99 |
| Propargyl p-toloxyisopropyl sulfite | | 78 |
| Propargyl 1-paraisopropylphenoxy-2-butyl sulfite | | 98 |
| Propargyl p-tert.-amylphenoxyisopropyl sulfite | 100 | 100 |
| Propargyl 1-paratertiarybutylphenoxy-2-butyl sulfite | | 97 |
| Propargyl 1-paratertiaryamylphenoxy-2-butyl sulfite | | 100 |
| Propargyl 3-paratertiarybutylphenoxy-2-butyl sulfite | 97 | 77 |
| Propargyl 1-paratertiarybutylphenoxy-2-amyl sulfite | 100 | 100 |
| Propargyl o-toloxyisopropoxyisopropyl sulfite | | 80 |
| Propargyl p-toloxyisopropoxyisopropyl sulfite | | 77 |
| Propargyl p-isopropylphenoxyethoxyethyl sulfite | | 64 |
| Propargyl p-isopropylphenoxyisopropoxyisopropyl sulfite | 100 | 99 |
| Propargyl 1-(1-paraisopropylphenoxy-2-butoxy)-2-butyl sulfite | | 96 |
| Propargyl 2-methyl-4-p-tert.-butylphenoxyisopropoxyisopropyl sulfite | | 99 |
| Propargyl p-tert.-butylphenoxyethoxyisopropyl sulfite | 99 | 86 |

EXAMPLE IV

This example also illustrates the effectiveness of the chemicals of the present invention for controlling mites.

Pinto beans in the two-leaf stage and grown in 4" baskets under greenhouse conditions at 70° F.-75° F. were used. Two plants for a total of four leaves were in each basket for each test. These tests on the chemicals were replicated once.

The untreated leaves were ringed with adhesive and 40-50 mites were transferred to each leaf similarly to Example III.

The plants were then sprayed to thoroughly wet the upper surface of the leaves with aqueous solutions of the chemicals at concentrations of 50 p.p.m. and 20 p.p.m. prepared as in Example III.

The plants were allowed to dry and a count of the mites was made. The plants were kept in the greenhouse for three days. A final count of the living mites remaining on the leaves was then made. The percent control is found by the formula used in Example III.

The control of mites by the chemicals of the present invention is shown in the following table:

| Chemical | Percent Control at— | |
|---|---|---|
| | 50 p.p.m. | 20 p.p.m. |
| Propargyl p-tert.-butylphenoxy-isopropyl sulfite | 100 | 84 |
| Propargyl p-tert.-butylphenoxy-isopropoxyisopropyl sulfite | 95 | 87 |
| 1-(2-Butynyl) p-tert.-butylphenonoxy-isopropyl sulfite | 87 | 85 |

The chemicals of the present invention may be applied in various manners for the control of insects. They may be applied to loci to be protected against insects as dusts when admixed with or adsorbed on powdered solid carriers, such as the various mineral silicates, e.g. mica, talc, pyrophillite and clays, or as liquids or sprays when in a liquid carrier, as in solution in a suitable solvent, such as acetone, benzene or kerosene, or dispersed in a suitable non-solvent medium, for example, water. In protecting plants (the term including plant parts) which are subject to attack by insects, the chemicals of the present invention are preferably applied as aqueous emulsions containing a surface-active dispersing agent, which may be an anionic, non-ionic or cationic surface-active agent. Such surface-active agents are well known and reference is made to U.S. Patent No. 2,547,724, columns 3 and 4, for detailed examples of the same. The chemicals of the invention may be mixed with such surface-active dispersing agents, with or without an organic solvent as insecticidal concentrates for subsequent addition of water to make aqueous suspensions of the chemicals of the desired concentration. The chemicals of the invention may be admixed with powdered solid carriers, such as mineral silicates together with a surface-active dispersing agent so that a wettable powder may be obtained, which may be applied directly to loci to be protected against insects, or which may be shaken up with water to form a suspension of the chemical (and powdered solid carrier) in water for application in that form. The chemicals of the present invention may be applied to loci to be protected against insects by the aerosol method. Solutions for the aerosol treatment may be prepared by dissolving the chemical directly in the aerosol carrier which is liquid under pressure but which is a gas at ordinary temperature (e.g. 20° C.) and atmospheric pressure, or the aerosol solution may be prepared by first dissolving the chemical in a less volatile solvent and then admixing such solution with the highly volatile liquid aerosol carrier. The chemicals may be used admixed with carriers that are active of themselves, for example, other insecticides, fungicides or bactericides.

Having thus described our invention, what we claim and desire to protect by Letters Patent is:

1. A chemical represented by the general formula

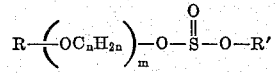

in which $n$ is 2 to 10, $m$ is 1 to 10, R is selected from the group consisting of phenyl, naphthyl, phenyl and naphthyl having substituents consisting of up to 5 halo radicals selected from the class consisting of bromo and chloro, and mono-substituted phenyl and naphthyl having the substituent selected from the group consisting of alkyl having up to 9 carbon atoms, cyclohexyl, chloromethyl and methoxy, and R' is acyclic alkynyl of the formula $C_nH_{2n-3}-$ where n is 3 to 10.

2. Propargyl p-tert.-butylphenoxyisopropoxyisopropyl sulfite.

3. Propargyl p-tert.-butylphenoxydiisopropoxyisopropyl sulfite.

4. Propargyl p-tert.amylphenoxyethyl sulfite.

5. 2-(3-butynyl) p-tert.-amylphenoxyethyl sulfite.

6. 1-(2-butynyl) p-tert.-butylphenoxyisopropoxyisopropyl sufite.

References Cited by the Examiner
UNITED STATES PATENTS

| | | | |
|---|---|---|---|
| 2,435,274 | 2/48 | Hester | 167—30 |
| 2,820,808 | 1/58 | Harris et al. | 260—456 |
| 2,955,979 | 10/60 | Van Strien | 167—30 |
| 2,968,667 | 6/61 | Lawlor | 260—456 |
| 3,035,910 | 5/62 | Boyack et al. | 71—2.6 |
| 3,075,835 | 1/63 | Fischer | 71—2.6 |
| 3,123,460 | 3/64 | Schafer et al. | 71—2.3 |
| 3,124,447 | 3/64 | Winneman et al. | 71—2.3 |

CHARLES B. PARKER, *Primary Examiner.*